Aug. 6, 1929.                T. A. EDISON                1,723,609
APPARATUS FOR PRODUCING STORAGE BATTERY ELECTRODE ELEMENTS
Original Filed July 24, 1925
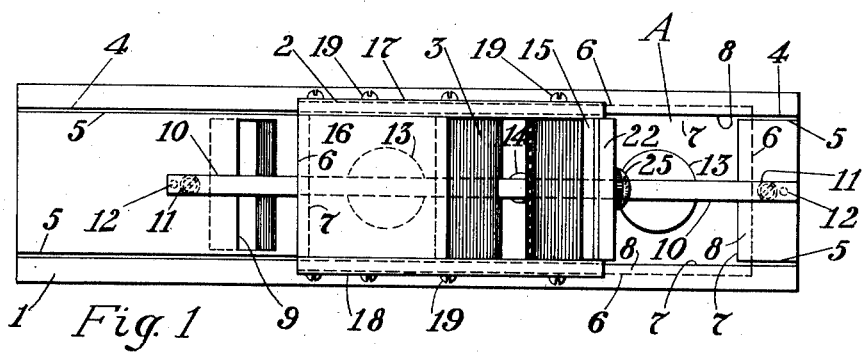
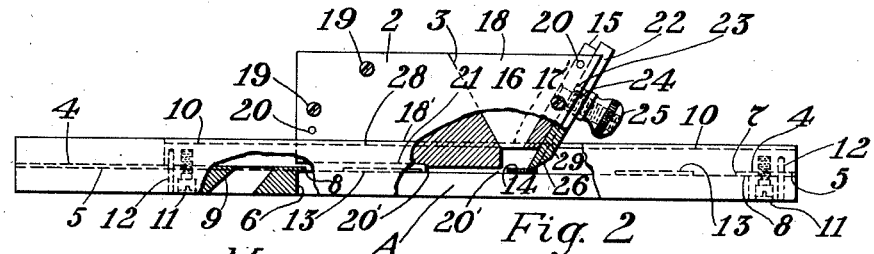
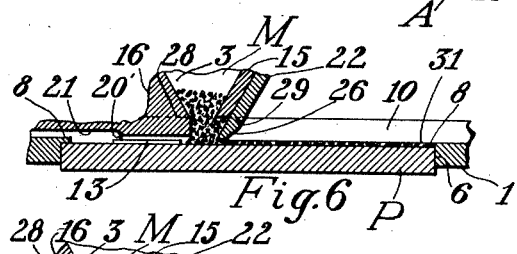
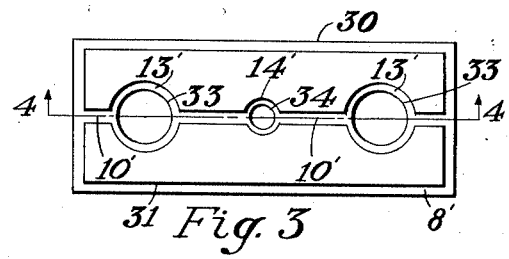
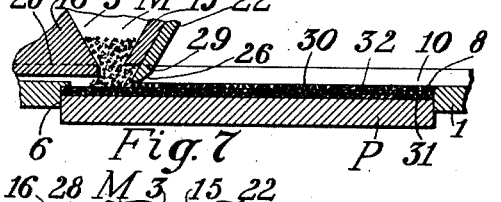
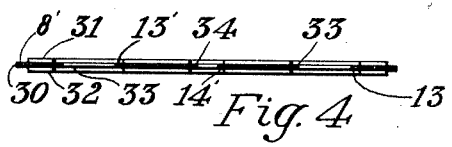
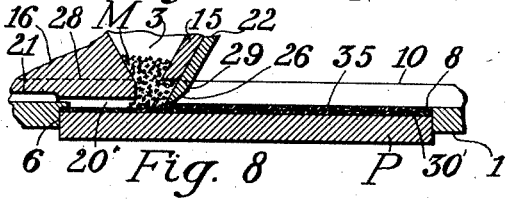
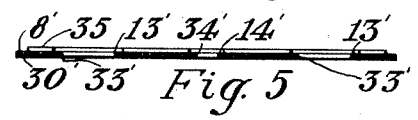
INVENTOR
Thomas A. Edison
BY Henry Lanahan
ATTORNEY Patented Aug. 6, 1929.

1,723,609

UNITED STATES PATENT OFFICE.

THOMAS A. EDISON, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

APPARATUS FOR PRODUCING STORAGE-BATTERY ELECTRODE ELEMENTS.

Original application filed July 24, 1925, Serial No. 45,781. Divided and this application filed October 12, 1927. Serial No. 225,619.

This application is a division of my copending application Serial No. 45781, filed July 24, 1925 and patented November 15, 1927, No. 1,649,579, and entitled Storage battery electrode elements and the production thereof, which copending patent application contains claims on a storage battery electrode element and also on the method of producing such element.

The present invention relates to an improved apparatus for use in making storage battery elements, and particularly to apparatus for carrying out certain steps in the method described in my said application Serial No. 45781, of producing such elements.

My improved apparatus has been designed especially for the purpose of applying active material in a dry finely divided state to one or both sides of insulating sheets or other supports for such material, preparatory to subjecting such sheets or supports with the layers of active material applied thereto to a heavy pressure for the purpose of compressing the dry finely divided active material into dense coherent coatings and firmly uniting the same to the supports, and then forming a battery pile structure containing a number of such coated sheets or supports. In assembling such a structure a considerable number of the coated sheets are usually superimposed with a suitable contact sheet or member between each two adjacent coated sheets or members so as to provide a battery pile with electrode elements which are alternately negative and positive, and the elements forming such pile are then secured together under pressure between clamping or pressure plates disposed at either end of the pile by bolts or rods, preferably constituting the poles of the pile, extending through the clamping plates and also through the elements of the pile, and nuts threaded on said rods, as described in several of my previous patents and also in said application Serial No. 45781. It will be understood, however, that my improved apparatus may be used for other purposes.

It is extremely important, in electrode elements of the type described, that each layer of active material applied to an insulating sheet or other support therefor, contain exactly the proper amount of such material and also that the layer be of proper size and shape and of uniform thickness; and it is the principal object of this invention to provide simple and effective apparatus whereby these results can be readily attained.

Other objects and features of my invention will be hereinafter more fully described and claimed.

For a clearer understanding of my invention, attention is directed to the drawing accompanying and forming a part of this specification and in which:

Figure 1 is a plan view of a preferred form of my improved apparatus;

Fig. 2 is a view in side elevation, partly in section, of the apparatus shown in Fig. 1;

Fig. 3 is a plan view of an electrode element formed by applying a channeled layer of active material to each side of an insulating sheet by the use of my improved apparatus, and then subjecting said insulating sheet and layers of active material to pressure;

Fig. 4 is a sectional view on line 4—4 of Fig. 3;

Fig. 5 is a view similar to Fig. 4, showing an electrode element comprising an insulating sheet having a channeled layer of active material applied to but one side or surface thereof;

Figs. 6 and 7 are detailed sectional views of the apparatus shown in Figs. 1 and 2, illustrating how the same is used in applying a channeled layer of active material to each side of an insulating sheet or support; and Fig. 8 is a view similar to Figs. 6 and 7, showing how the apparatus is used in applying a channeled layer of active material to but one side of an insulating sheet or support.

Referring to the drawing, my improved apparatus as adapted for applying active material to insulating sheets or other supports, comprises a rectangular channeled base 1 and a device 2 slidably mounted on said base and provided with a hopper 3. The channel 4 extends the whole length of the base 1 and is provided at its opposite sides with guiding grooves 5. The base 1 has a large rectangular opening A extending therethrough, said opening comprising a lower section 6 of the same shape and size as the insulating sheets to be coated, and an upper section 7 of reduced area intercepting the bottom of the channel 4 and having the same size and shape as the coatings of active material to be applied to the insulating sheets, the construction and arrangement being such that the opposite side walls of the section 7 of the opening A are respectively in the same planes as the opposite side walls of the channel 4. The opening A is provided with flanges 8 on all four sides, which flanges define the section 7 of the opening, are flush with the bottom of the channel 4 and have a thickness corresponding to the desired thickness of the layers of active material applied to the insulating sheets before subjecting the same to pressure. At a small distance beyond one end of opening A, the bottom of the channel 4 of base 1 is also provided with an inclined opening 9 extending therethrough and transversely thereof, the said opening 9 providing for the discharge of the surplus active material deposited from the hopper 3 of the apparatus in applying a layer of such material to an insulating sheet or other support, as will be hereinafter described. To provide each layer of the active material of the finished elements with suitable circulating channels, and to prevent the active material from being applied to the edge portions of the insulating sheets or supports, means are provided for blocking out certain portions of the said sheets or supports, this means as shown consisting of the flanges 8 already referred to, and a member 10 which is preferably in the form of a rectangular bar and which is suitably secured as by means of screws 11, to the bottom of the channel 4 of the base. The bar 10 extends entirely across the opening A and it is important that said bar be secured to the base 1 so that it will be midway between the opposite side walls of the section 7 of such opening. To attain this result the base 1 is provided with centering pins 12 which respectively engage openings formed in the bar 10 adjacent the ends thereof as shown. The lower surfaces of the end portions of bar 10 closely engage the bottom of the channel 4, while the intermediate portion of said bar is formed to extend downwardly within the section 7 of the opening A with the lower surface thereof flush with the lower surfaces of the flanges 8. That portion of the bar 10 which extends within the section 7 of the opening A is provided adjacent its ends with enlarged circular portions 13 the lower surfaces of which are flush with the lower surfaces of the flanges 8, and midway between its ends with another similar but smaller circular portion 14.

The hopper device 2 comprises two members 15 and 16 having spaced opposed oppositely inclined walls between which the hopper 3 is formed, said members being secured between two side plates 17 and 18 by means of screws 19 and rivets 20. The members 15 and 16 of the hopper device 2 are a little less in width than the channel 4 of the base 1, and the hopper device is removably positioned on the base with the lower portions of the members 15 and 16 disposed in the channel 4 and with shoulders 17' and 18' formed adjacent the lower edges of the side plates 17 and 18 resting upon the tracks provided by the upper surfaces of the sides of the channel. The parts of the hopper device are so constructed and arranged that when the device is thus positioned, the lower edge of member 15 will lie closely adjacent the upper surface of the bar 10 and there will be a slight clearance between the lower surface of that portion of the hopper member 16 adjacent the discharge opening of the hopper and the bottom of the channel 4 and the upper surfaces of the enlarged circular portions 13 and 14 of bar 10. The reduced portions of the side plates 17 and 18 below the shoulders 17' and 18' are of such thickness that when the hopper device 2 is in the position described, they will lie very close to the adjacent side walls of the channel 4. The bottom edges of the side plates 17 and 18 for the major portion of the length of said plates, are flush with the bottom of the hopper member 16, but are provided at the end portions thereof adjacent the hopper 3 with downward extensions 20' which engage and fit closely within the guiding grooves 5 in the bottom of the channel 4. To facilitate the sliding movement of the hopper device 2 on the base 1, the bottom of the member 16 and the side plates 17 and 18, for a considerable distance from the left hand end of the hopper device 2, are reduced in height or cut back as indicated at 21 to increase the clearance between this part of the hopper device and the bottom of the channel 4. A plate 22 is adjustably secured against the outer face of the hopper member 15 by means of a bolt 23 secured at one end to the hopper member 15 and extending through an enlarged opening 24 in the plate 22, and a nut 25 threaded on the outer end of said bolt. The inclined plate 22 is provided with a lower beveled end portion 26 and this plate is secured to member 15 so that when the hopper device 2 is in place the bottom edge of the plate will be in substantially the same plane as the top surfaces of the flanges 8 and of the enlarged portions 13 and 14 of member 10. In case the lower end portion of the plate 22 becomes worn the plate may readily be adjusted to proper position upon loosening the nut 25. The hopper members 16 is provided on its under side and centrally thereof with a longitudinally extending rectangular recess 28 and the plate 22 is provided with a similar recess 29 aligned with the recess 28, said recesses being engaged by the bar 10 when the hopper device 2 is positioned on the base 1.

In Figs. 3 and 4 I have shown an electrode element consisting of an asbestos or other insulating sheet 30 having on one side a thin layer of a suitable active material, such as iron or oxide of iron, and on the other side a thin layer of another suitable active material, such as nickel hydroxide. Adjacent its ends and midway between its side edges the asbestos sheet 30 is provided with circular openings 33 through which the poles of the battery pile extend when a plurality of electrode elements are assembled into a battery pile. The sheet 30 is also provided with a smaller central circular opening 34, and when a plurality of elements such as described are assembled into a battery pile, the central openings thereof provide a path for the circulation of electrolyte. To prevent the layers of active material on the asbestos sheet 30 from shedding or being broken off at their edges, and from coming into contact with the poles which are to extend through the openings 33, and in order to further facilitate the circulation of electrolyte, each surface of the insulating sheet is provided with uncovered portions carrying no active material, namely, the edge portions 8', the annular portions 13' and 14' surrounding the openings 33 and 34, and the straight narrow portions or channels 10' located midway of the edges of the sheet and extending between the annular portions 13' and 14' and from the annular portions 13' to the ends of the layer of active material. Obviously the corresponding channels in the layers of active material as well as the other corresponding uncovered portions of the opposite surfaces of the insulating sheet will be in alignment.

The element shown in Fig. 5 is similar in all respects to the element shown in Figs. 3 and 4, except that the asbestos sheet 30' thereof has a channeled layer of active material 35 applied to but one side thereof.

In producing an electrode element such as shown in Figs. 3 and 4, I proceed as follows: A flat pressure plate P of the same size as the lower section 6 of the opening A in base 1, is disposed in such section 6 with the edge portions of its upper surface in engagement with the lower surfaces of flanges 8. The hopper device 2 is then positioned on the base 1 with the discharge opening of the hopper over the bottom of the channel 4 of the base at the right of opening A, and the hopper is filled with the dry, loose, finely divided active material to be deposited, for example, finely divided iron or oxide of iron. The hopper 3 is of such size as to hold a quantity of active material somewhat in excess of that necessary to form one complete layer of active material of the desired thickness. The hopper device 2 is now moved from right to left on the base 1 (referring to Figs. 1 and 2), so that the discharge opening of the hopper moves entirely across the openings A and 9. In this sliding movement of the hopper device 2 a layer 31 of finely divided iron is deposited on the upper surface of the presser plate P, such layer being of a uniform thickness equal to the thickness of flanges 8 and the enlarged circular portions 13 and 14 of bar 10 and covering all surface portions of the presser plate P except those which are blocked out by said flanges 8, member 10 and enlarged portions 13 and 14. As the active material is deposited on the presser plate P in the movement of the hopper device 2 from right to left, the edge of the lower beveled end portion 26 of the plate 22 acts as a scraper or evener, whereby the layer 31 of active material produced will be of uniform thickness and will have a flat, even upper surface. In the depositing of this layer of active material, the extensions 20' of the plates 18 and 19 act to define the edges of the layer and to prevent material being displaced laterally beyond the limits defined thereby under the action of the scraper provided by the plate 22. The surplus active material in the hopper 3, that is, the material in excess of that sufficient to form the layer 31 is discharged from the hopper through the opening 9. The presser plate P with the layer of active material 31 thereon is now removed from the base 1 and a sheet 30 of asbestos or other suitable insulating material is placed on the layer 31. The presser plate P is then again disposed in the lower section 6 of the opening A with the edge portions of the upper surface of the asbestos sheet 30 in engagement with the lower surfaces of the flanges 8. A layer 32 of dry, loose, finely divided nickel hydroxide is now deposited on the upper surface of the asbestos sheet 30 in the same manner as the layer of iron or oxide of iron was deposited on the presser plate P. The presser plate P carrying the layers of active material 31 and 32 and the intermediate asbestos sheet 30 is now removed from the base 1, a second presser plate similar to plate P is placed on the upper layer 32 of active material, and this assembly is then subjected to an enormous pressure, preferably a pressure of several tons per square inch, in a hydraulic press. Under this pressure the layers 31 and 32 of dry, loose, finely divided active material are compacted and formed into dense coherent channeled sheets of uniform thickness with smooth flat surfaces and are firmly united to the respective surfaces of the asbestos sheet 30.

I may also produce an electrode element such as that shown in Figs. 3 and 4, by joining two asbestos or other insulating sheets each having a channeled layer of active material on but one side, as follows: A presser plate P with an insulating sheet 30' thereon is disposed within the lower section 6 of opening A, with the edge portions of the upper surface of the asbestos sheet in engagement with the lower surfaces of flanges 8, as shown in Fig. 8. A layer of dry, loose, finely divided active material 35 is then deposited on the asbestos sheet 30' from the hopper 3 in the manner above described. The presser plate P carrying the sheet 30' and the layer of active material 35 is now removed from the base 1, another presser plate similar to plate P is placed on the layer 35, and this assembly is then subjected to enormous pressure, as described above, to compact and form the layer of active material 35 into a dense coherent sheet of uniform thickness, and at the same time to unite such layer firmly to the asbestos sheet 30'. This results in an element such as that shown in Fig. 5. Two such elements are then assembled with the uncoated surfaces of the insulating sheets thereof in engagement, between presser plates, and such assembly is then subjected to a heavy pressure so as to firmly unite the insulating sheets. The layers of active material on the two asbestos sheets thus united should of course in the case of the particular form of electrode elements herein described, be respectively formed of nickel hydroxide and iron or oxide of iron.

It is distinctly understood that the apparatus specifically described herein is subject to various changes and modifications without departure from the spirit of the invention and the scope of the appended claims.

Having now fully described my invention, what I claim as new and desire to protect by Letters Patent is as follows:

1. Apparatus of the character described comprising a base having an opening therein, a hopper device, said base and hopper device being connected for relative sliding movement in a given path traversing said opening, said base being provided with means including flanges about said opening for locating within said opening a member having a flat upper surface to be coated with material discharged from said hopper, said flanges being adapted to coact with such member when located in said opening to maintain the member in a position with its said surface disposed a distance below the upper plane of said opening equal to the thickness of the flanges, substantially as described.

2. Apparatus of the character described comprising a base having an opening therein, a hopper device, said base and hopper device being connected for relative sliding movement in a given path traversing said opening, and means for locating in said opening and at a predetermined distance below the discharge of the hopper a member to be coated with material discharged from said hopper, said hopper device being provided adjacent the discharge of the hopper with a scraper for evening the surface of material discharged from the hopper onto said member when located in said opening, said base being provided with an opening located beyond said first opening in the path of the relative movement of the base and hopper device for discharging from the apparatus any surplus material discharged from the hopper, substantially as described.

3. Apparatus of the character described, comprising a base having an opening therein, a hopper device, said base and hopper device being connected for relative sliding movement in a given path traversing said opening, means for locating in said opening and at a predetermined distance below the discharge of the hopper a member to be coated with material discharged from said hopper, and blocking-out means distinct from said hopper device and member, fixed to said base and having sliding interengagement with the hopper device, said blocking-out means extending across and into said opening, substantially as described.

4. Apparatus of the character described comprising a base having an opening therein, a hopper device, said base and hopper device being connected for relative sliding movement in a given path traversing said opening, said base being provided with means for locating at a given position within said opening a member to be coated with material discharged from said hopper, said hopper being provided with means for evening the surface of material discharged from the hopper onto said member when located in said position within said opening, and said base having an opening located beyond said first opening in the path of the relative movement of the base and hopper device for discharging from the apparatus any surplus material discharged from the hopper, substantially as described.

This specification signed this 11th day of October, 1927.

THOS. A. EDISON.